United States Patent Office 3,213,100
Patented Oct. 19, 1965

3,213,100
1-CYCLOALKOXY-2(1H)-PYRIDONES
Leo A. Paquette, Portage Township, Kalamazoo County, Mich., assignor to The Upjohn Company, Kalamazoo, Mich., a corporation of Delaware
No Drawing. Filed Sept. 16, 1963, Ser. No. 309,285
3 Claims. (Cl. 260—297)

This invention relates to novel compositions of matter and to methods for producing them. In particular, this invention relates to novel 1-cycloalkoxy-2(1H)-pyridones of the formula:

(I)

wherein $R_1$ is a cycloalkyl of 4 to 12 carbon atoms, inclusive, and wherein $R_2$ is selected from the group consisting of hydrogen and methyl. When $R_2$ is methyl, it can be located at the 3-, 4-, 5-, or 6-position of the pyridone ring.

Examples of cycloalkyl of 4 to 12 carbon atoms, inclusive, are cyclobutyl, 2-methylcyclobutyl, 2,3-dimethylcyclobutyl, 3,3- dimethylcyclobutyl, cyclopentyl, 2-methylcyclopentyl, 3 - methylcyclopentyl, 2 - ethylcyclopentyl, 3-butylcyclopentyl, 2,3,4-trimethylcyclopentyl, cyclohexyl, 2 - methylcyclohexyl, 3 - methylcyclohexyl, 4-methylcyclohexyl, 3-ethylcyclohexyl, 4-tert-butylcyclohexyl, 2,4-dimethylcyclohexyl, 4-hexylcyclohexyl, cycloheptyl, 3-methylcycloheptyl, 4-butylcycloheptyl, cyclooctyl, and the like.

The novel 1-cycloalkoxy-2(1H)-pyridones of Formula I have demonstrated anti-inflammatory activity as shown by the granuloma pouch technique in rats, and are useful in treating inflammatory conditions topically, locally, and systemically in mammals, e.g., humans, cattle, horses, dogs, and cats, and in birds, e.g., poultry. Tests with animals have also shown these compounds to have sedative effects, and the compounds are therefore useful for that purpose. These compounds also inhibit the action of Newcastle disease virus on chick embryo cells.

The novel compounds of FORMULA I are basic and exist either in the non-protonated (free base) form or in the protonated (acid addition salt) form depending on the pH of the environment. They form stable protonates, i. e., acid addition salts, on neutralization with suitable strong acids, for example, hydrochloric, hydrobromic, sulfuric, phosphoric, nitric, methanesulfonic, picric, trichloroacetic acids, and the like. These acid addition salts are useful for upgrading the free bases.

The novel Formula I compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The novel 1-cycloalkoxy-2(1H)-pyridones of Formula I are produced by reacting a pyridine 1-oxide of the formula:

(II)

wherein $R_2$ is as defined above and wherein $R_3$ is alkyl of 1 to 3 carbon atoms, inclusive, with a cycloalkyl halide of the formula, $R_1X$, wherein $R_1$ is as defined above and X is selected from the group consisting of chloride, bromide, and iodide. Examples of alkyl of 1 to 3 carbon atoms, inclusive, are methyl, ethyl, and propyl.

Pyridine 1-oxides of Formula II are either known in the art or can be prepared by methods known in the art [e. g., J. Am. Chem. Soc. 81, 2537–41 (1959); J. Chem. Soc. 1864–6 (1948); J. Chem. Soc. 2091–4 (1949); J. Chem. Soc. 4375–85 (1957)].

Cycloalkyl halides of the formula, $R_1X$, are either known in the art or can be prepared by methods known in the art, for example, by reaction of the corresponding alcohol with a phosphorus halide or by addition of a hydrogen halide to the appropriate cycloalkene. Examples of suitable halides are the chlorides, bromides, and iodides of the specific cycloalkyl moieties given above.

The reaction between a Formula II pyridine 1-oxide and a cycloalkyl halide is carried out by mixing these two reactants and heating the mixture in the range about 75° to about 175° C., preferably in the range of about 100° to about 150° C., for about 1 to about 10 hours. It is preferred to react about equal molecular amounts of the two reactants, although it is often advantageous to use an excess of the cycloalkyl halide when the latter has a relatively low boiling point and is likely to be lost by evaporation during the reaction. Although it is preferred to carry out the reaction in the absence of a diluent, especially when the reaction mixture is a homongeneous liquid at the reaction temperature, an inert liquid diluent, for example, a hydrocarbon or an ether of the appropriate boiling point, can be used. Examples of suitable diluents are xylene, tetrahydronaphthalene, and dibutyl ether. The desired 1-cycloalkoxy-2(1H)-pyridone can be isolated from the reaction mixture and purified by conventional techniques, for example, by fractional distillation, recrystallization, or chromatography.

The invention can be more fully understood by the following examples.

EXAMPLE 1

*1-cyclopentyl-2(1H)-pyridone*

A mixture of 2-ethoxypyridine 1-oxide (7.0 g.; 0.05 mole) and cyclopentyl chloride (5.3 g.; 0.05 mole) was heated and stirred 6 hours at 120–130° C. The resulting brown oil was cooled and adsorbed on a 250-g. column of neutral alumina (60–100 mesh). After elution of a trace of unreacted cyclopentyl chloride with 250 ml. of hexane, further elution with 2000 ml. of diethyl ether and evaporation of the latter eluate gave 3.3 g. of a white solid; M.P. 50–60° C. Three recrystallizations from a mixture of ethyl acetate and hexane gave 1-cyclopentyloxy-2(1H)pyridone in the form of white cubes; M.P. 66–67° C.

*Analysis.*—Calcd. for $C_{10}H_{13}NO_2$: C, 67.02; H, 7.31; N, 7.82. Found: C, 66.89; H, 7.29; N, 7.56.

U.V. ($C_2H_5OH$) 229 m$\mu$ ($\epsilon$=6,050);

302 m$\mu$ ($\epsilon$=5,450)

I.R. (principal band; mineral oil mull), 1660 cm.$^{-1}$.

Following the procedure of Example 1 but using in place of cyclopentyl chloride, cyclobutyl bromide; cyclohexyl chloride; 3-methylcyclopentyl iodide; 4-isopropylcyclohexyl chloride; 4-tert-butylcyclohexyl chloride; and cycloheptyl bromide, there are obtained 1-cyclobutoxy-2(1H)-pyridone; 1-cyclohexyloxy-2(1H)-pyridone; 1-(3-methylcyclopentyloxy)-2(1H)-pyridone; 1-(4-isopropylcyclohexyloxy) - 2(1H)-pyridone; 1-(4-tert-butyl-cyclohexyloxy)-2(1H)-pyridone; and 1-cycloheptyloxy-2(1H)-pyridone, respectively.

Following the procedure of Example 1 but using in place of the combination cyclopentyl chloride and 2-ethoxypyridine 1-oxide, cyclopentyl bromide and 2-methoxypyridine 1-oxide; 3-butylcyclopentyl chloride and 3-methyl-2-ethoxypyridine 1-oxide; cyclohexyl bromide and 4-methyl-2-methoxypyridine 1-oxide; 4-hexylcyclohexyl bromide and 5-methyl-2-ethoxypyridine 1-oxide; cycloheptyl bromide and 6-methyl-2-methoxypyridine 1-oxide; and cyclooctyl bromide and 2-propoxypyridine 1-oxide, there are obtained 1-cyclopentyloxy-2(1H)-pyridone; 1-(3 - butylcyclopentyloxy) - 3-methyl-2(1H)-pyridone; 1-cyclohexyloxy - 4 - methyl - 2(1H)-pyridone; 1-(4-hexylcyclohexyloxy)-5-methyl-2(1H)-pyridone; 1-cycloheptyloxy - 6 - methyl-2(1H)-pyridone; and 1-cyclooctyloxy-2(1H)-pyridone, respectively.

I claim:
1. A compound of the formula:

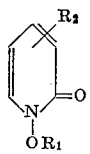

wherein $R_1$ is cycloalkyl of 4 to 12 carbon atoms, inclusive, and wherein $R_2$ is selected from the group consisting of hydrogen and methyl.

2. 1-cyclopentyloxy-2(1H)-pyridone.

3. A process for producing a 1-cycloalkoxy-2(1H)-pyridone of the formula:

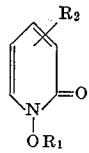

wherein $R_1$ is cycloalkyl of 4 to 12 carbon atoms, inclusive, and wherein $R_2$ is selected from the group consisting of hydrogen and methyl, which comprises mixing a pyridine 1-oxide of the formula:

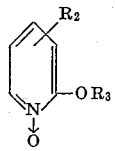

wherein $R_2$ is as defined above and wherein $R_3$ is alkyl of 1 to 3 carbon atoms, inclusive, with a cycloalkyl halide of the formula, $R_1X$, wherein $R_1$ is as defined above and X is selected from the group consisting of chloride, bromide, and iodide, to form said 1-cycloalkoxy-2(1H)-pyridone.

No references cited.

WALTER A. MODANCE, *Primary Examiner.*